United States Patent Office 3,453,069
Patented July 1, 1969

3,453,069
SEPARATION OF RARE EARTH ELEMENTS
Leonard George Sherrington, Vicars Cross, Chester, and James Maurice Hewitt, Widnes, England, assignors to Thorium Limited, London, England, a British company
No Drawing. Filed Feb. 2, 1967, Ser. No. 613,427
Claims priority, application Great Britain, Feb. 4, 1966, 5,100/66
Int. Cl. C22b 59/00
U.S. Cl. 23—22     7 Claims

ABSTRACT OF THE DISCLOSURE

Europium is separated from a mixture of rare earths by providing an aqueous solution containing trivalent rare earth ions and divalent europium ions, precipitating the trivalent rare earth ions, filtering the mixture and recovering europium from the filtrate, characterised in that magnesium oxide is used as the precipitating agent.

---

This invention relates to the separation and purification of europium from mixtures of rare earths.

Separation and purification of europium compounds used to be based mainly on the low solubility of europium (II) sulphate; several precipitations are necessary to achieve high purity.

Europium is unique among the rare earths in that it is easily reduced from the trivalent to the divalent state. Accordingly, techniques have been suggested in which trivalent rare earths are precipitated as hydroxide leaving divalent europium salts in solution. Europium is the only rare earth readily reduced by zinc in aqueous solutions, so that if reduction is followed by addition of a base such as ammonia, all rare earths are precipitated except europium. This technique yields high purity europium much more quickly than the older method of precipitating europium (II) sulphate.

The use of ammonia and alkali for the above separations has been described by Pechiney in British Patents 902,753 and 902,754, and by Vitro Chemical Corporation in U.S. Patent 3,153,571. Ammonia was found to be the most convenient since excess fails to precipitate the europium; caustic soda on the other hand must be added carefully to pH 8 to achieve a good separation.

However, according to the present invention we have made the surprising discovery that an improved separation may be achieved by adding excess magnesium oxide instead of ammonia.

The invention envisages a process for separating europium from a mixture of rare earths, which comprises the essential step of precipitating trivalent rare earth ions in the presence of divalent europium (II) ions using magnesium oxide.

The process according to our invention comprises preferably the following steps:

(1) Dissolving a mixture of rare earth oxides containing europium oxide in enough hydrochloric acid to render the solution of rare earth chlorides slightly acid, (2) Adding sufficient zinc dust to effect reduction of the europic ions to europium (II) ions in the solution, (3) Heating the solution in an inert atmosphere, (4) Adding an excess of MgO to the solution, (5) Heating and filtering the solution, (6) Oxidising the filtered solution to convert europium (II) ions to europic ions, (7) Precipitating the europic ions as europic oxalate in acid conditions.

In the process of the invention, enough hydrochloric acid is usually added to the mixture of rare earth oxides to give a pH of about 4, e.g. from 3.5 to 4.5.

Normally, from 2 to 5 times (e.g. about 3 times) the stoichiometric amount of MgO is added to the solution containing europium (II) ions. The MgO may be the normal commercial heavy grade.

When the filtered solution which usually had a pH of between 7 and 8 is oxidised, hydrogen peroxide will be found to be a suitable oxidising agent, although hypochlorite or sulphate ions or atmospheric oxidation may be used.

Of course, it will be appreciated that the precipitate of europic oxalate (which may be obtained by adding an aqueous solution of oxalic acid to the solution containing europic ions) may be dried and ignited to europic oxide.

The procedure outlined above has the following advantages over the prior art.

(1) The precipitate produced by excess magnesium oxide is more granular and easier to filter than the gelatinous precipitate obtained by adding ammonia.

(2) Substantially all the zinc ions in solution are precipitated on adding magnesium oxide, leaving a solution of europium (II) chloride containing only traces of other rare earths and zinc. Ammonia does not do this and separation of pure europium is more complicated in the presence of zinc.

Europium is useful in the electronics industry as an activator for phosphors in colour television tubes.

Our invention is more particularly described in the following non-limiting examples.

EXAMPLE 1

450 g. of mixed rare earth oxides containing 49.5% $Eu_2O_3$ were dissolved in the minimum amount of hydrochloric acid and diluted to about 4 litres. 500 g. of zinc dust were added. Reduction of the europic ions in solution was effected by heating the solution for 1½ hours in an atmosphere of nitrogen at a temperature of 95° C–100° C. The pH was kept at 3 to 4. 750 g. of MgO were added as a slurry and the mixture heated at 85°–95° C. for 1½ hours. The final pH was 7.2. The mixture was then filtered and the filtered solution oxidised by hydrogen peroxide. Oxalic acid was added to the oxidised solution and the resulting precipitated europic oxalate was dried and ignited to give an almost white europic oxide, indicating a high degree of purity.

EXAMPLE 2

46 g. of a rare earth concentrate containing 47.5% $Eu_2O_3$ and 30% of $Nd_2O_3$ were dissolved in the minimum amount of hydrochloric acid as in Example 1. 50 g. of zinc dust were added and reduction carried out as in Example 1. 75 g. MgO were added and the mixture heated as in Example 1. Two samples taken gave pH values of 7.6 and 7.95. Europic oxide was separated by the method described in Example 1. A good indication of the purity of the final product is the level of neodymium present, neodymium being a convenient rare earth for determination. The separated $Eu_2O_3$ was found to contain 30 p.p.m. of $Nd_2O_3$ at both pH's 7.6 and 7.95. This indicated a high degree of purity.

We claim:

1. A process for separating europium from a mixture of rare earths comprising providing an aqueous solution containing trivalent rare earth ions and divalent europium ions, heating said solution in an inert atmosphere and adding thereto an amount of magnesium oxide in stoichiometric excess over that required to precipitate said trivalent rare earth ions, heating and filtering the mixture and recovering europium from the filtrate.

2. A process as claimed in claim 1 further comprising preparing the aqueous solution containing trivalent rare earth ions and divalent europium ions by dissolving a mixture of rare earth oxides, including europic oxide, in hydrochloric acid, and reducing europic ions to europium (2+) ions in the solution by the addition of zinc dust.

3. A process as claimed in claim 2, characterised in that the solution of rare earth oxides in hydrochloric acid has a pH of from 3.5 to 4.5.

4. A process as claimed in claim 1, characterised in that from 2 to 5 times the stoichiometric amount of magnesium oxide is added to the solution containing europium (2+) ions.

5. A process as claimed in claim 1, characterised in that the filtered solution has a pH of from 7 to 8.

6. A process as claimed in claim 1 further comprising oxidizing the europium (2+) ions in the filtered solution to europic ions and precipitating the latter as europic oxalate under acid conditions.

7. A process as claimed in claim 6, characterised in that hydrogen peroxide is used as the oxidising agent.

References Cited

UNITED STATES PATENTS 3,153,571  10/1964  Bronaugh _____ 23—22

FOREIGN PATENTS 902,754  8/1962  Great Britain.

OTHER REFERENCES

McCoy: "Journal of American Chemical Soc.," vol. 58, 1933, pp. 2279–2281.

Spedding et al.: "The Rare Earths," John Wiley & Sons, New York, 1961, pp. 29–33, 576–578.

HERBERT T. CARTER, *Primary Examiner.*

U.S. Cl. X.R.

23—23, 183; 260—42.92